United States Patent
Fauner et al.

(10) Patent No.: US 10,738,700 B2
(45) Date of Patent: Aug. 11, 2020

(54) TURBINE ASSEMBLY

(71) Applicant: General Electric Company, Schenectady, NY (US)

(72) Inventors: Thomas Fauner, Munich (DE); Florian Hoefler, Ismaning (DE); Jorge Alejandro Carretero Benignos, Munich (DE)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 548 days.

(21) Appl. No.: 15/352,773

(22) Filed: Nov. 16, 2016

(65) Prior Publication Data
US 2018/0135519 A1    May 17, 2018

(51) Int. Cl.
*F02C 7/18*      (2006.01)
*F01D 25/12*    (2006.01)
(Continued)

(52) U.S. Cl.
CPC ............... *F02C 7/18* (2013.01); *F01D 5/187* (2013.01); *F01D 25/12* (2013.01); *F02C 3/04* (2013.01);
(Continued)

(58) Field of Classification Search
CPC .......... F01D 5/187; F01D 25/12; F01D 5/186; F01D 5/183; F01D 5/188–5/189;
(Continued)

(56) References Cited

U.S. PATENT DOCUMENTS 3,844,343 A * 10/1974 Burggraf ................. F01D 11/08
                                                        165/109.1
4,073,599 A     2/1978 Allen et al.
(Continued)

FOREIGN PATENT DOCUMENTS

CN        202023597 U    11/2011
EP         2 584 145 A1    4/2013
(Continued)

OTHER PUBLICATIONS

Gao et al., "Heat transfer to impinging round jets with triangular tabs", International Journal of Heat and Mass Transfer, vol. 46, Issue: 14, pp. 2557-2569, Jul. 2003.
(Continued)

*Primary Examiner* — Ehud Gartenberg
*Assistant Examiner* — Jacek Lisowski
(74) *Attorney, Agent, or Firm* — The Small Patent Law Group LLC; Mary D. Lawlor

(57) ABSTRACT

An assembly comprises a first cooling cavity disposed within one or more of a turbine assembly or a combustion chamber of an engine. The first cooling cavity directs cooling air within the one or more of the turbine assembly or the combustion chamber. The assembly comprises a second cooling cavity also disposed within the one or more of the turbine assembly or the combustion chamber. The second cooling cavity receives at least some of the cooling air from the first cooling cavity. A forward facing step nozzle forms a channel that fluidly couples the first cooling cavity with the second cooling cavity. The step nozzle includes steps having elongated first sides and narrow second sides. The elongated first sides of the steps protrude into the channel such that a cross-sectional area of the channel of the step nozzle at the steps is smaller than a cross-sectional area of the channel of the step nozzle outside of the steps.

10 Claims, 9 Drawing Sheets

(51) Int. Cl.
*F02C 3/04* (2006.01)
*F01D 5/18* (2006.01)

(52) U.S. Cl.
CPC .... *F05D 2220/32* (2013.01); *F05D 2240/121* (2013.01); *F05D 2240/303* (2013.01); *F05D 2250/12* (2013.01); *F05D 2250/121* (2013.01); *F05D 2250/14* (2013.01); *F05D 2250/141* (2013.01); *F05D 2250/323* (2013.01); *F05D 2250/511* (2013.01); *F05D 2260/20* (2013.01); *F05D 2260/201* (2013.01); *F05D 2260/2212* (2013.01)

(58) Field of Classification Search
CPC .......... F02C 7/18; F02C 3/04; F05D 2220/32; F05D 2240/121; F05D 2240/303; F05D 2250/12; F05D 2250/121; F05D 2250/14; F05D 2250/141; F05D 2250/323; F05D 2250/511; F05D 2260/20; F05D 2260/201; F05D 2260/2212; F05D 2260/22141; F23R 2900/03043; F23R 2900/03045
See application file for complete search history.

(56) References Cited

U.S. PATENT DOCUMENTS

| | | | |
|---|---|---|---|
| 5,752,801 A | 5/1998 | Kennedy | |
| 6,238,183 B1* | 5/2001 | Williamson | F01D 5/189 |
| | | | 416/96 A |
| 6,579,061 B1 | 6/2003 | Heyward et al. | |
| 7,056,093 B2 | 6/2006 | Self et al. | |
| 7,690,892 B1 | 4/2010 | Liang | |
| 8,079,813 B2 | 12/2011 | Liang | |
| 8,231,349 B2 | 7/2012 | Naik et al. | |
| 8,613,597 B1 | 12/2013 | Liang | |
| 8,734,108 B1 | 5/2014 | Liang | |
| 8,777,569 B1 | 7/2014 | Liang | |
| 8,826,668 B2 | 9/2014 | Lee et al. | |
| 9,296,039 B2* | 3/2016 | Propheter-Hinckley | |
| | | | B22C 9/10 |
| 9,376,920 B2 | 6/2016 | McBrien et al. | |
| 9,849,510 B2 | 12/2017 | Lacy et al. | |
| 2005/0053458 A1 | 3/2005 | Liang | |
| 2008/0286115 A1 | 11/2008 | Liang | |
| 2013/0209235 A1 | 8/2013 | Xu | |
| 2014/0000262 A1 | 1/2014 | Boeke et al. | |
| 2014/0238028 A1 | 8/2014 | Yamane et al. | |
| 2014/0290257 A1 | 10/2014 | Okita et al. | |
| 2016/0090847 A1 | 3/2016 | Shchukin | |
| 2016/0160657 A1* | 6/2016 | Lewis | F01D 5/187 |
| | | | 415/115 |
| 2016/0348536 A1 | 12/2016 | Lacy et al. | |
| 2017/0051612 A1 | 2/2017 | Sezer et al. | |

FOREIGN PATENT DOCUMENTS

| | | |
|---|---|---|
| JP | 2012202335 A | 10/2012 |
| JP | 2013253770 A | 12/2013 |

OTHER PUBLICATIONS

Tomoki et al., "Experimental Study on Control of an Impinging Jet Heat Transfer Using Triangular Tabs", Journal of fluid science and technology, vol. 4, Issues: 2, pp. 292-303, 2009.

Liu, Z., and Feng, Z., "Numerical simulation on the effect of jet nozzle position on impingement cooling of gas turbine blade leading edge," International Journal of Heat and Mass Transfer, vol. 54, pp. 4949-4959 (2011).

Metzger, D.E., et al., "Impingement Cooling Performance in Gas Turbine Airfoils Including Effects of Leading Edge Sharpness," Journal of Engineering for Power, pp. 219-225 (Jul. 1972).

Extended European Search Report and Opinion issued in connection with corresponding EP Application No. 17199889.1 dated Mar. 26, 2018.

* cited by examiner

TURBINE ASSEMBLY

FIELD

The subject matter described herein relates to turbine assemblies.

BACKGROUND

Impingement cooling assemblies have been used with turbine machinery in order to cool various components such as turbine assemblies, combustion chambers, and the like. Impingement cooling systems utilize air flowing inside an assembly such as a turbine assembly or combustion chamber. In the assembly, the pressurized air is led through one or more impingement holes. The high velocity jet is directed to a target wall which is under a high heat load.

One issue with known impingement cooling assemblies, however, is that the cooling assemblies tend to require complicated assemblies in order to improve the heat transfer coefficient over the turbine assemblies. Such an improved system may provide an increased heat transfer coefficient, leading to better cooling performance which can be the enabler for higher turbine inlet temperatures, thus higher turbine efficiency. At the same time, higher heat transfer coefficients can have a positive effect on part lifetime or can be the enabler for reduced cooling flow consumption.

BRIEF DESCRIPTION

In one embodiment, an assembly comprises a first cooling cavity disposed within one or more of a turbine assembly or a combustion chamber of an engine. The first cooling cavity directs cooling air within the one or more of the turbine assembly or the combustion chamber. The assembly comprises a second cooling cavity also disposed within the one or more of the turbine assembly or the combustion chamber. The second cooling cavity receives at least some of the cooling air from the first cooling cavity. A forward facing step nozzle forms a channel that fluidly couples the first cooling cavity with the second cooling cavity. The step nozzle includes steps having elongated first sides and narrow second sides. The elongated first sides of the steps protrude into the channel such that a cross-sectional area of the channel of the step nozzle at the steps is smaller than a cross-sectional area of the channel of the step nozzle outside of the steps.

In one embodiment, an assembly comprises a first cooling cavity disposed within one or more of a turbine assembly or a combustion chamber of an engine. The first cooling cavity directs cooling air within the one or more of the turbine assembly or the combustion chamber. The assembly comprises a second cooling cavity also disposed within the one or more of the turbine assembly or the combustion chamber. The second cooling cavity receives at least some of the cooling air from the first cooling cavity. A forward facing step nozzle forms a channel that fluidly couples the first cooling cavity with the second cooling cavity. The step nozzle includes steps having elongated first sides and narrow second sides. The elongated first sides of the steps are disposed on opposing sides of the channel.

In one embodiment, a method for cooling one or more of a turbine assembly or a combustion chamber of an engine comprises fluidly coupling a first cooling cavity and a second cooling cavity with a channel. The first cooling cavity directs cooling air within one or more of the turbine assembly or the combustion chamber. The second cooling cavity receives at least some of the cooling air from the first cooling cavity. The method comprises positioning a forward facing step nozzle at an intersection between the channel and the second cooling cavity. The step nozzle includes steps having elongated first sides and narrow second sides. The elongated first sides of the steps protrude into the channel such that a cross-sectional area of the channel of the step nozzle at the steps is smaller than a cross-sectional area of the channel of the step nozzle outside of the steps.

BRIEF DESCRIPTION OF THE DRAWINGS

The present inventive subject matter will be better understood from reading the following description of non-limiting embodiments, with reference to the attached drawings, wherein below.

DETAILED DESCRIPTION

Figure 1:
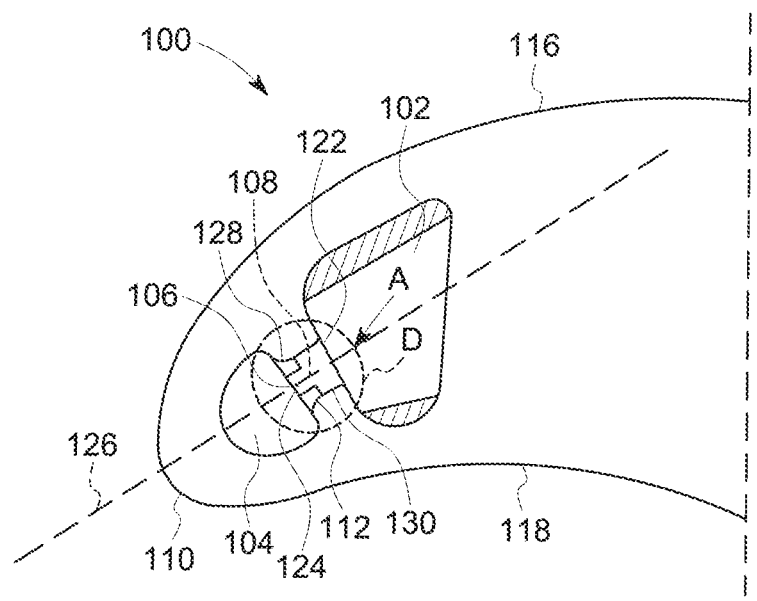
FIG. 1 illustrates a cross-sectional view of a turbine assembly in accordance with one embodiment.

FIG. 1 illustrates a cross-sectional view of a turbine assembly 100 in accordance with one embodiment. The turbine assembly 100 may be a turbine blade used in a turbine. The turbine assembly 100 extends between a first surface 116 and an opposite second surface 118. The first surface and second surface 116, 118 may be curved about a common axis in order to facilitate the movement of air flowing through the turbine. The turbine assembly 100 has a leading edge 110 that interconnects the first and second surfaces 116, 118. The leading edge 110 of the turbine assembly 100 is positioned distal to a rotating shaft of the turbine. In the illustrated embodiment, the turbine assembly 100 is a unitary structure with integrated passages that enable the movement of cooling air through the turbine assembly. For example, cavities, passages, chambers, or the like may be integrally fabricated with the airfoil. Optionally, the turbine blade may incorporate a baffle design. For example, a separate baffle component having a similar contour shape as the airfoil may be inserted into the airfoil such that cooling air flows through the baffle within the airfoil.

The turbine assembly 100 includes a first interior cooling cavity 102 and a second interior cooling cavity 104. The first and second cooling cavities 102, 104 are disposed within the interior of the turbine assembly 100. For example, the first and second cooling cavities 102, 104 are entirely contained within the turbine assembly 100 between the first and second surfaces 116, 118. In the illustrated embodiment, the size of the first cooling cavity 102 is larger than the size of the second cooling cavity 104. Optionally, the first and second cooling cavities 102, 104 may be of uniform shape and size. Optionally, the size of the second cooling cavity 104 may be larger than the size of the first cooling cavity 102.

The second cooling cavity 104 is disposed proximate to the leading edge 110 relative to the first cooling cavity 102. For example, the second cooling cavity 104 is located closer to the leading edge 110 and distal the rotating shaft of the turbine assembly than the first cooling cavity 102.

The first cooling cavity 102 is fluidly coupled with the second cooling cavity 104 by a forward facing step nozzle 106. The forward facing step nozzle 106 forms a channel 108 that interconnects the first and second cooling cavities 102, 104. The channel 108 is a passage that extends along a longitudinal axis 126 between the first and second cooling cavities 102, 104. The channel 108 has a first surface 128 and an opposite second surface 130 that are generally parallel or curved to the longitudinal axis 126. The channel has a front end 122 that is open to the first cooling cavity 102. The channel has a back end 124 that is open to the second cooling cavity 104. For example, the channel 108 interconnects the first and second cooling cavities 102, 104.

The first cooling cavity 102 directs cooling air within the turbine assembly 100 to the second cooling cavity 104. The cooling air travels in the direction A from the first cooling cavity 102 through the forward facing step nozzle 106 to the second cooling cavity 104. For example, the cooling air flows in a direction towards the leading edge 110 of the turbine assembly 100 in order to cool the leading edge 110 when the turbine is operating.

Figure 2:
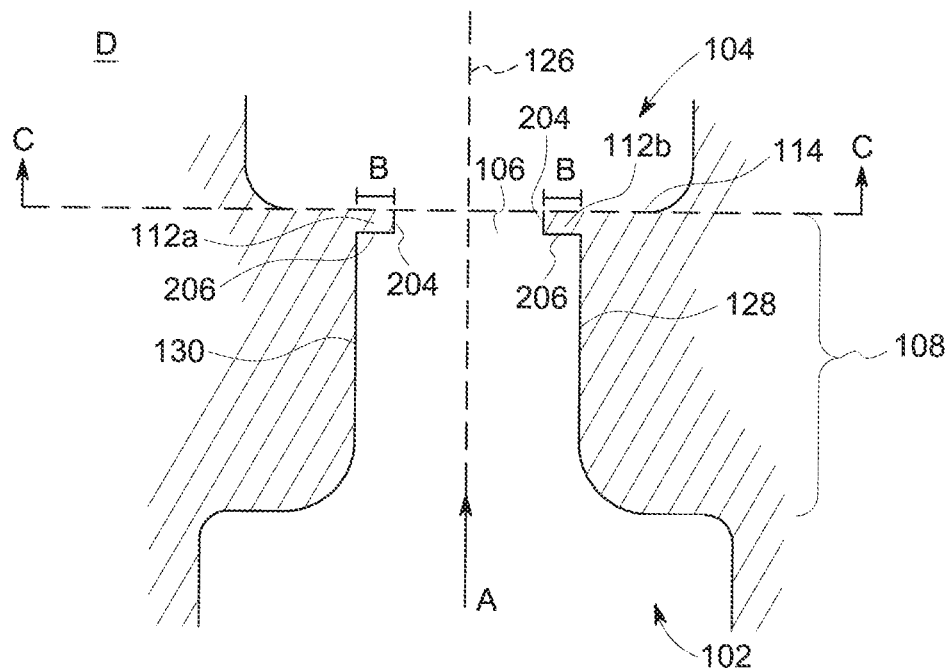
FIG. 2 illustrates a detailed cross-sectional view of a first cooling cavity, a second cooling cavity, and a channel of FIG. 1 in accordance with one embodiment.

FIG. 2 illustrates a cross-sectional view of the first and second cooling cavities 102, 104 and the channel 108 in accordance with one embodiment. The forward facing step nozzle 106 has steps 112 at an intersection 114 between the channel 108 and the second cooling cavity 104. In the illustrated embodiment, the steps 112 are generally planar with the intersection 114 at the back end 124 of the channel 108. Optionally, the steps 112 may be positioned at any other location within the channel between the first and second cooling cavities 102, 104. Optionally the steps 112 may be non-parallel, angled, or the like with respect to the intersection 114. The steps 112 extend into the channel 108 from the first and second surfaces 128, 130 of the channel in a direction towards the longitudinal axis 126. The forward facing step nozzle 106 has a first step 112a and a second step 112b. In the illustrated embodiment, the first and second steps 112a, 112b have a uniform shape and size. Optionally, the first step 112a may have a unique shape and/or size relative to the second step 112b.

The steps 112 of the forward facing step nozzle 106 are integrally fabricated as a continuous structure with the channel 108. For example, the steps 112 may be casted, machined, cut, molded, 3D printed, or the like to form an integrally fabricated structure with the channel 108. Optionally, the steps 112 may be individual components that are joined to the channel 108 at the intersection 114 between the channel 108 and the second cooling cavity 104. For example, the steps 112 may be welded, screwed, adhered, or the like to the channel 108 at the intersection 114.

The steps 112 have elongated first sides 204 and narrow second sides 206. The elongated first sides 204 will be described and illustrated in more detail pertaining to FIGS. 3 and 4. The narrow second sides 206 are generally perpendicular with the first and second surfaces 128, 130 of the channel 108. Optionally, the narrow second sides 206 may be non-perpendicular, angled, or the like, with respect to the first and second surfaces 128, 130. The narrow second sides 206 are positioned facing towards the first cooling cavity 102. The narrow second sides 206 of the steps 112 protrude into the channel 108 towards the longitudinal axis 126 a distance B. The narrow second sides 206 extend into the channel 108 such that a cross-sectional area of the channel 108 at the steps 112 is smaller than a cross-sectional area of the channel 108 outside of the steps 112. For example, the steps 112 of the forward facing step nozzle 106 produce a cross-sectional area of the channel 108 at the intersection 114 that is smaller than the cross-sectional area of the channel 108 away from the intersection 114. For example, the cooling air flowing in the direction A transfers through a narrowing channel 108 from the first cooling cavity 102 to the second cooling cavity 104.

Figure 3:
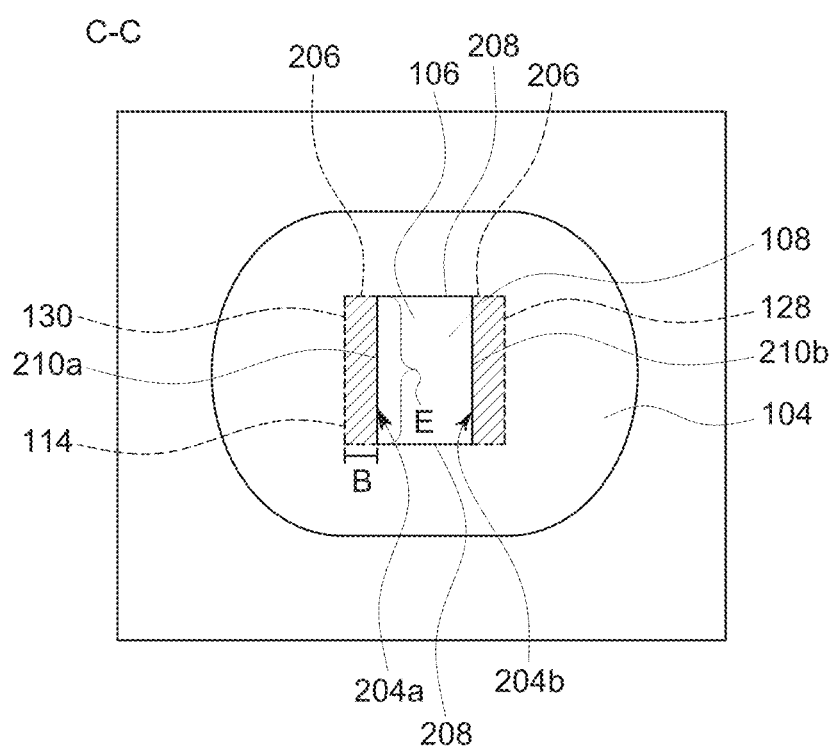
FIG. 3 illustrates a top view of the channel of FIG. 1 in accordance with one embodiment.

FIG. 3 illustrates a top view of the channel 108 opening into the second cooling cavity 104 in accordance with one embodiment. In the illustrated embodiment, the forward facing step nozzle 106 has a parallelogram cross-sectional shape. For example, the step nozzle 106 is a generally rectangular cross-sectional shape. The forward facing step nozzle 106 at the intersection 114 between the channel 108 and the second cooling cavity 104 has four sides. The step nozzle 106 has a first pair of opposing sides 208 and a second pair of opposing sides 210. The first pair of opposing sides 208 do not include the steps 112. The second pair of opposing sides 210 include the steps 112 of the step nozzle 106. For example, the steps 112 extend into the channel 108 from the second pair of opposing sides 210.

The elongated first sides 204 are generally parallel with the first and second surfaces 128, 130 of the channel 108. For example, the elongated first side 204 of the first step 112a is positioned facing towards the elongated first side 204 of the second step 112b. Optionally, the elongated first sides 204 may be non-parallel with the first and second surfaces 128, 130. For example, the elongated first sides 204 may be rounded or angled to a radial degree that is different than an angled radial degree of the first and second surfaces The elongated first sides 204 protrude into the channel 108. For example, the elongated first sides 204 protrude into the channel 108 a distance corresponding to the distance B of the narrow second sides 206. The elongated first sides 204 of the steps 112 extend a distance E between the first pair of opposing sides 208. For example, the elongated first sides 204 extend between the first pair of opposing sides 208 along the length of the second pair of opposing sides 210. Optionally, the elongated first sides 204 may extend a distance that is shorter than distance E. For example, the elongated first sides 204 may extend a partial distance between the first pair of opposing sides 208. In the illustrated embodiment, a first and second elongated first sides 204a, 204b extends a uniform distance E. For example, the first and second elongated first sides 204a, 204b extend a uniform distance along a first and second opposing second sides 210a, 210b, respectively, between the first pair of opposing sides 208. Optionally, the first elongated first side 204a may extend a distance shorter or longer than the second elongated first side 204b.

Figure 4A:
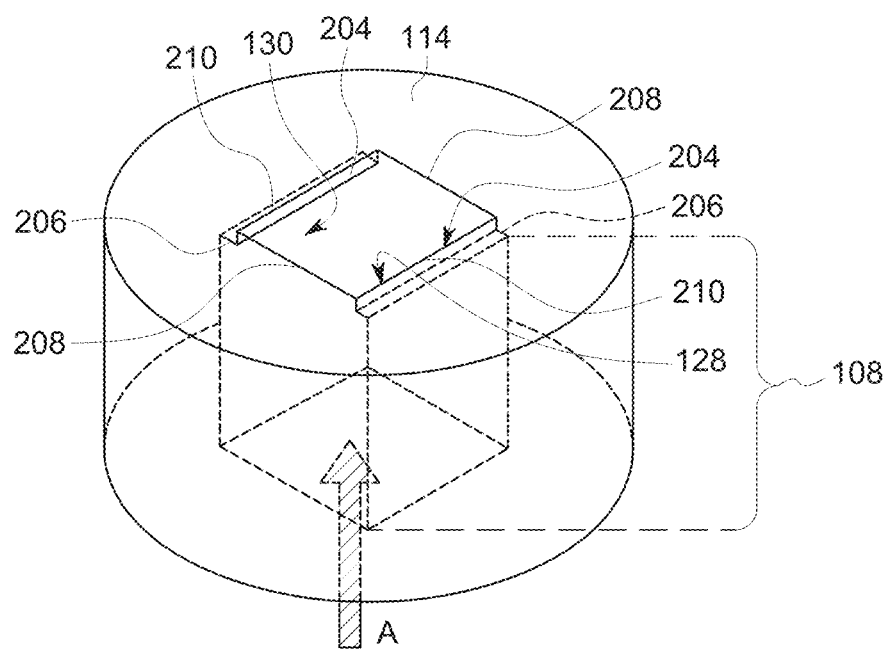
FIG. 4A illustrates a perspective view of a forward facing step nozzle and channel in accordance with one embodiment.
Figure 4B:
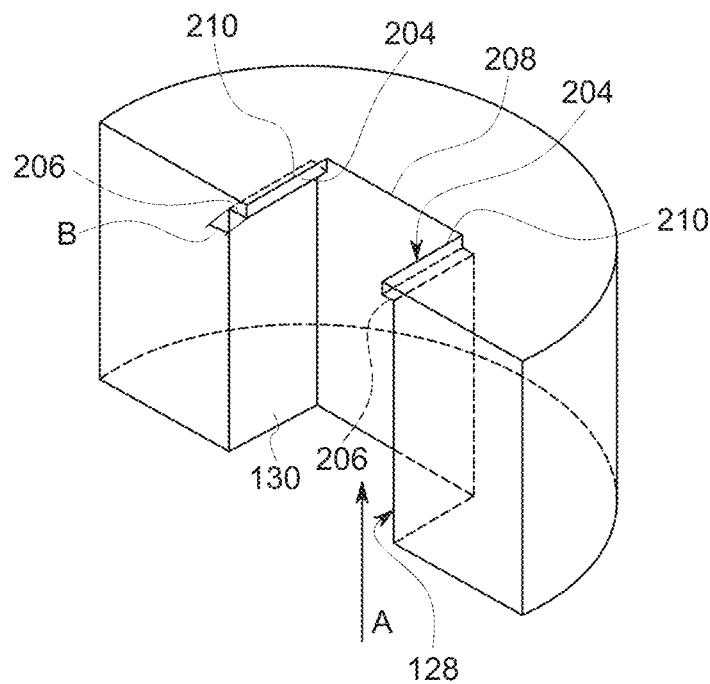
FIG. 4B illustrates a cross-sectional perspective view of FIG. 4A in accordance with one embodiment.

FIG. 4A illustrates a perspective view of the forward facing step nozzle 106 and the channel 108 in accordance with one embodiment. FIG. 4B illustrates a cross-sectional perspective view of FIG. 4A. The forward facing step nozzle 106 has a parallelogram cross-sectional shape. Cooling air transfers in the direction A from the first cooling cavity 102 through the channel 108 to the second cooling cavity 104. The steps 112 of the forward facing step nozzle 106 are positioned at the intersection 114 between the channel 108 and the second cooling cavity 104. The narrow second sides 206 of the steps 112 protrude into the channel a distance B (of FIGS. 2 and 3) away from first and second surfaces 128, 130 of the channel 108. The steps 112 protrude into the channel 108 such that the cross-sectional area of the channel 108 at the steps 112 is smaller than the cross-sectional area of the channel 108 outside of the steps. For example, the cross-sectional area of the channel 108 at the steps 112 may be 10% smaller than the cross-sectional area of the channel 108 outside of the steps 112. Alternatively, the cross-sectional area at the steps may be less than or greater than 10% smaller than the cross-sectional area of the channel 108 outside of the steps.

Figure 5A:
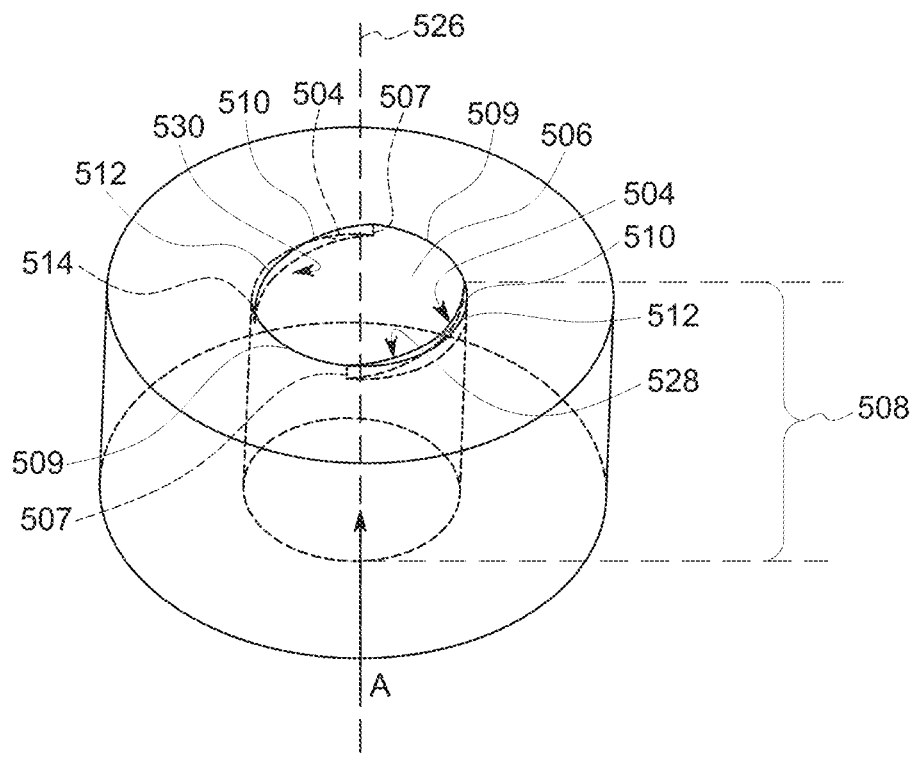
FIG. 5A illustrates a perspective view of a forward facing step nozzle and channel in accordance with one embodiment.
Figure 5B:
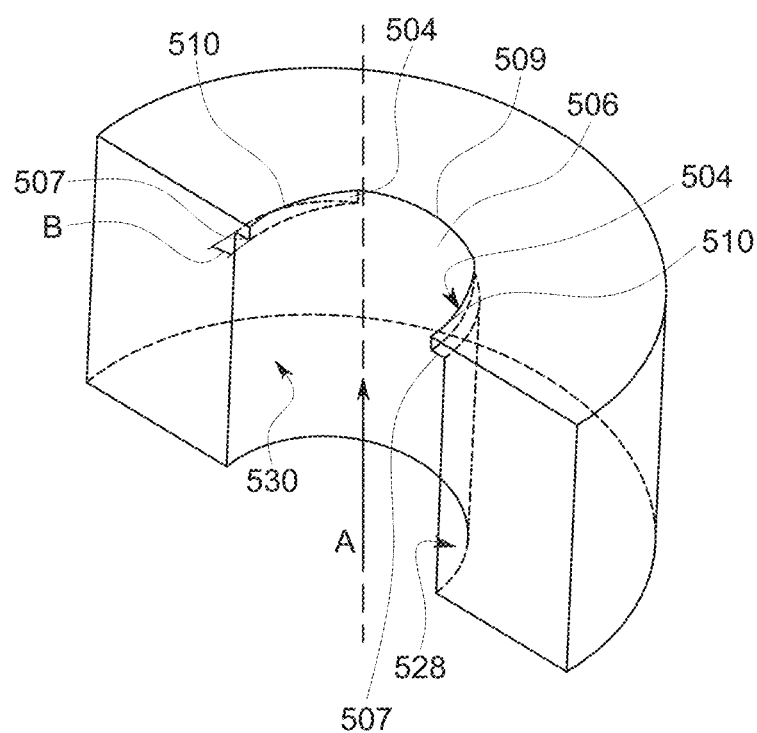
FIG. 5B illustrates a cross-sectional perspective view of FIG. 5A in accordance with one embodiment.

FIG. 5A illustrates a perspective view of a forward facing step nozzle 506 and a channel 508 in accordance with one embodiment. FIG. 5B illustrates a cross-sectional perspective view of FIG. 5A. The forward facing step nozzle 506 (corresponding to the forward facing step nozzle 106) has a closed curve cross-sectional shape. For example, the forward facing step nozzle 506 is generally circular in shape. Optionally, the forward facing step nozzle 506 may have an oval cross-sectional shape or the like. Cooling air transfers in the direction A from a first cooling cavity (e.g., first cooling cavity 102 of FIG. 1) through the channel 508 to a second cooling cavity (e.g., the second cooling cavity 104 of FIG. 1).

The forward facing step nozzle 506 has steps 512 at an intersection 514 between the channel 508 and a second cooling cavity. The steps 512 of the forward facing step nozzle 506 are integrally fabricated as a continuous structure with the channel 508. The steps 512 have elongated first sides 504 and narrow second sides 507 (corresponding to the elongated first sides 204 and narrow second sides 206 of FIGS. 4A and 4B). In the illustrated embodiment, the elongated first sides 504 are generally parallel with first and second surface 528, 530 of the channel 508, and the narrow second sides 507 are generally perpendicular with the first and second surfaces 528, 530 of the channel 508. The narrow second sides 507 of the steps 512 protrude into the channel 508 towards a longitudinal axis 526 a distance B. The narrow second sides 507 extend into the channel 508 such that a cross-sectional area of the channel 508 at the steps 512 is smaller than a cross-sectional area of the channel 508 outside of the steps 512. For example, the cooling air flowing in the direction A transfers through a narrowing channel 508 from a first cooling cavity to a second cooling cavity.

The step nozzle 506 has a first pair of opposing sides 509 and a second pair of opposing sides 510. The first pair of opposing sides 509 of the closed curved cross-sectional shape do not include the steps 512. The second pair of opposing sides 510 of the closed curved cross-sectional shape includes the steps 512 of the step nozzle 506. For example, the steps 512 extend into the channel 508 from the second pair of opposing sides 510. In the illustrated embodiment, the first pair of opposing sides 509 have an arc length generally uniform to an arc length of the second pair of opposing sides 510. For example, the first and second pair of opposing sides 509, 510 are generally extend a similar percentage of length of the entire closed curved cross-sectional shape of the step nozzle 506. Optionally, the first pair of opposing sides 509 may have an arc length smaller or larger than the arc length of the second pair of opposing sides 510.

Figure 6A:
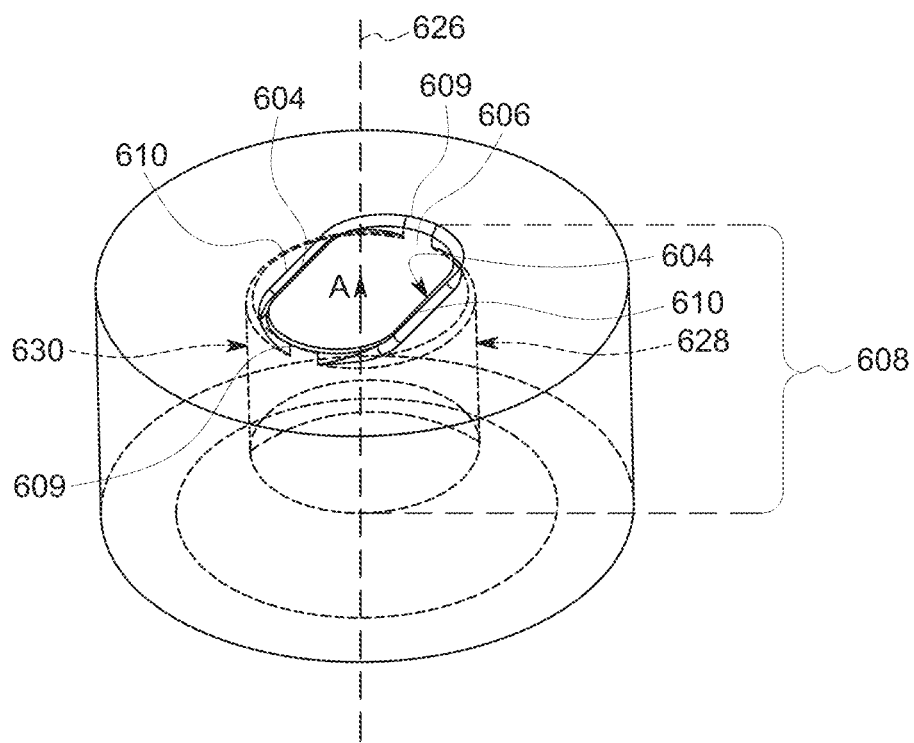
FIG. 6A illustrates a perspective view of a forward facing step nozzle and channel in accordance with one embodiment.
Figure 6B:
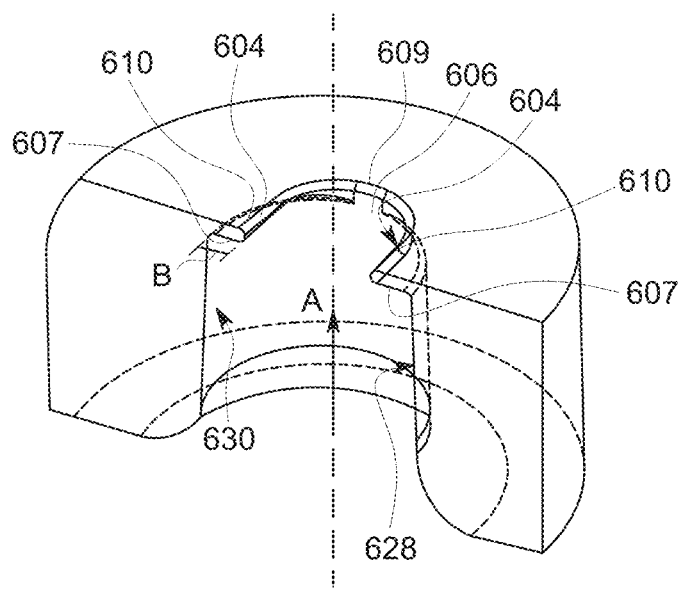
FIG. 6B illustrates a cross-sectional perspective view of FIG. 6A in accordance with one embodiment.

FIG. 6A illustrates a perspective view of a forward facing step nozzle 606 and a channel 608 in accordance with one embodiment. FIG. 6B illustrates a cross-sectional perspective view of FIG. 6A. The forward facing step nozzle 606 (corresponding to the forward facing step nozzle 106) has a closed curve cross-sectional shape. For example, the forward facing step nozzle 606 has generally an elliptical cross-sectional shape. Cooling air transfers in the direction A from a first cooling cavity (e.g., first cooling cavity 102 of FIG. 1) through the channel 608 to a second cooling cavity (e.g., the second cooling cavity 104 of FIG. 1).

The forward facing step nozzle 606 has steps 612 at an intersection 614 between the channel 608 and a second cooling cavity. The steps 612 of the forward facing step nozzle 606 are integrally fabricated as a continuous structure with the channel 608. The steps 612 have elongated first sides 604 and narrow second sides 607 (corresponding to the elongated first sides 204 and narrow second sides 206 of FIGS. 4A and 4B). In the illustrated embodiment, the elongated first sides 504 are generally non-parallel with first and second surface 628, 630 of the channel 608. For example, the elongated first sides 604 are generally curved about a longitudinal axis 626 to a radial degree in a generally oval cross-sectional shape. The generally oval cross-sectional shape is different than an angled radial degree of the generally round cross-sectional shape of the first and second surfaces 628, 630. The narrow second sides 607 are generally perpendicular with the first and second surfaces 628, 630 of the channel 608. The narrow second sides 607 of the steps 612 protrude into the channel 608 towards the longitudinal axis 626 a distance B. The narrow second sides 607 extend into the channel 608 such that a cross-sectional area of the channel 608 at the steps 612 is smaller than a cross-sectional area of the channel 608 outside of the steps 612. For example, the cooling air flowing in the direction A transfers through a narrowing channel 608 from a first cooling cavity to a second cooling cavity.

The step nozzle 606 has a first pair of opposing sides 609 and a second pair of opposing sides 610. The first pair of opposing sides 609 of the closed curved cross-sectional shape do not include the steps 612. The second pair of opposing sides 610 of the closed curved cross-sectional shape includes the steps 612 of the step nozzle 606. For example, the steps 612 extend into the channel 608 from the second pair of opposing sides 610. In the illustrated embodiment, the first pair of opposing sides 609 have an arc length generally uniform to an arc length of the second pair of opposing sides 610. For example, the first and second pair of opposing sides 609, 610 are generally extend a similar percentage of length of the entire closed curved cross-sectional shape of the step nozzle 606. Optionally, the first pair of opposing sides 609 may have an arc length smaller or larger than the arc length of the second pair of opposing sides 610.

Figure 7A:
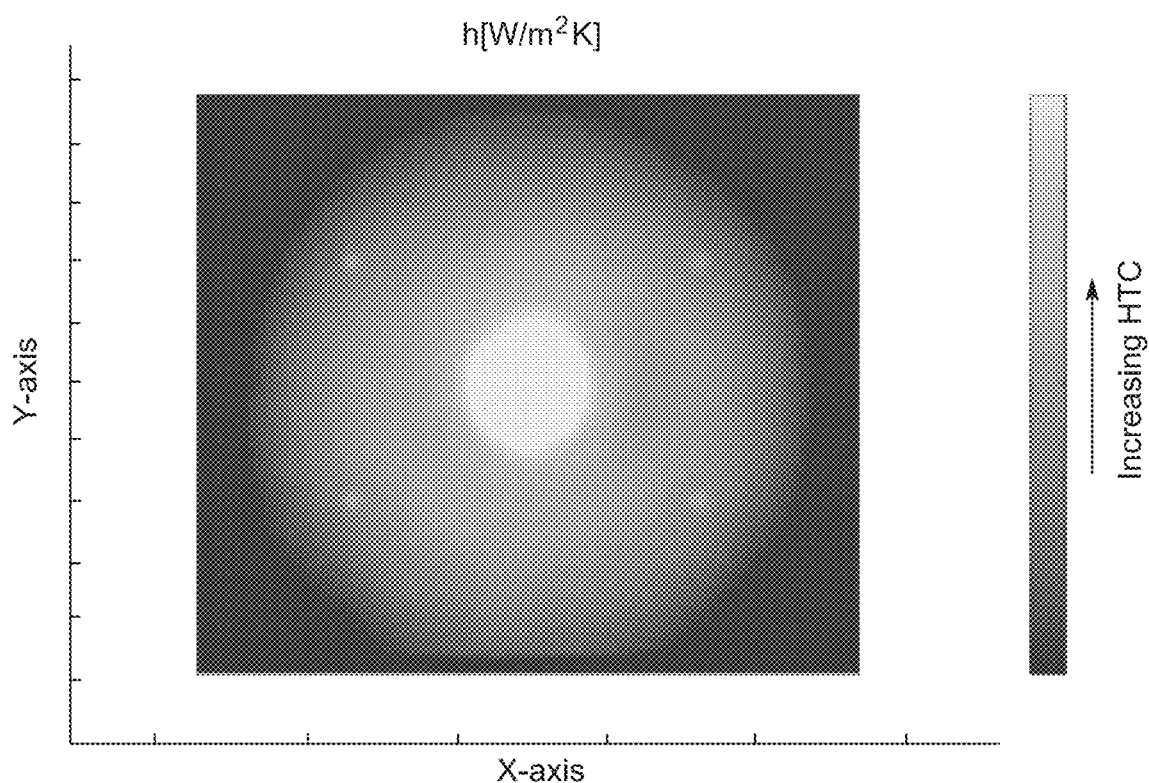
FIG. 7A illustrates a heat transfer coefficient map of a baseline channel devoid a forward facing step nozzle in accordance with one embodiment.
Figure 7B:
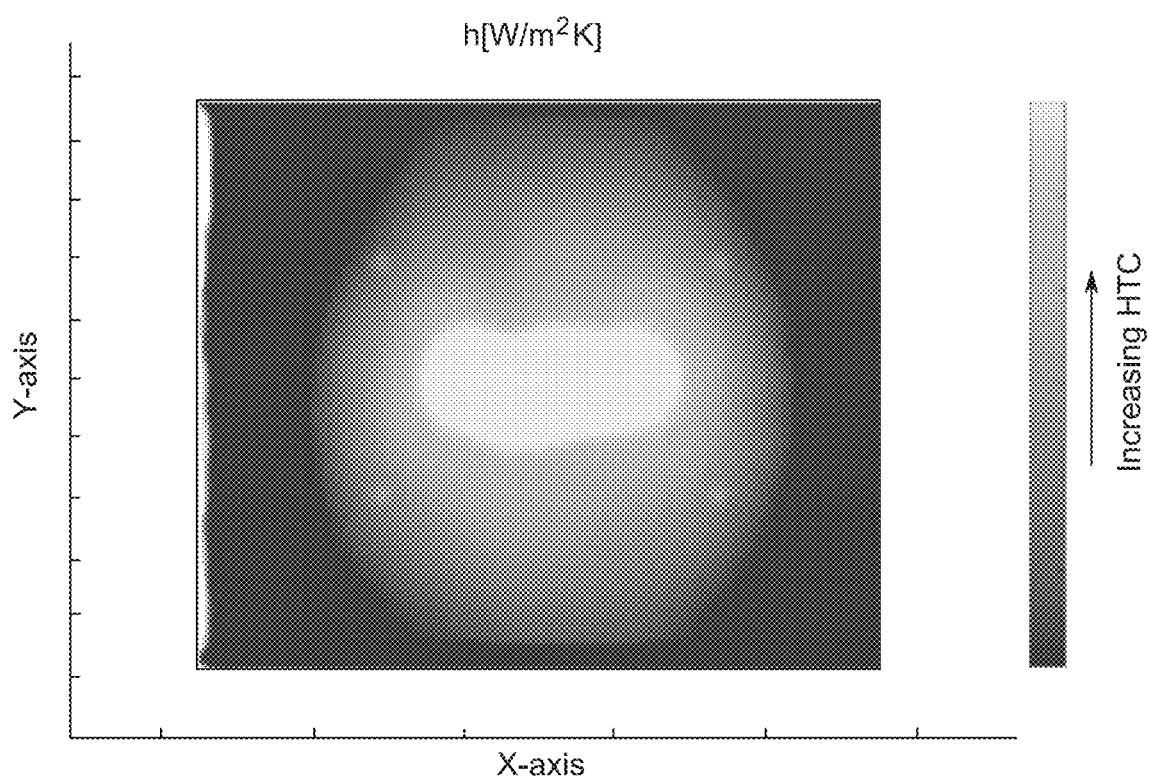
FIG. 7B illustrates a heat transfer coefficient map in accordance with one embodiment.
Figure 7C:
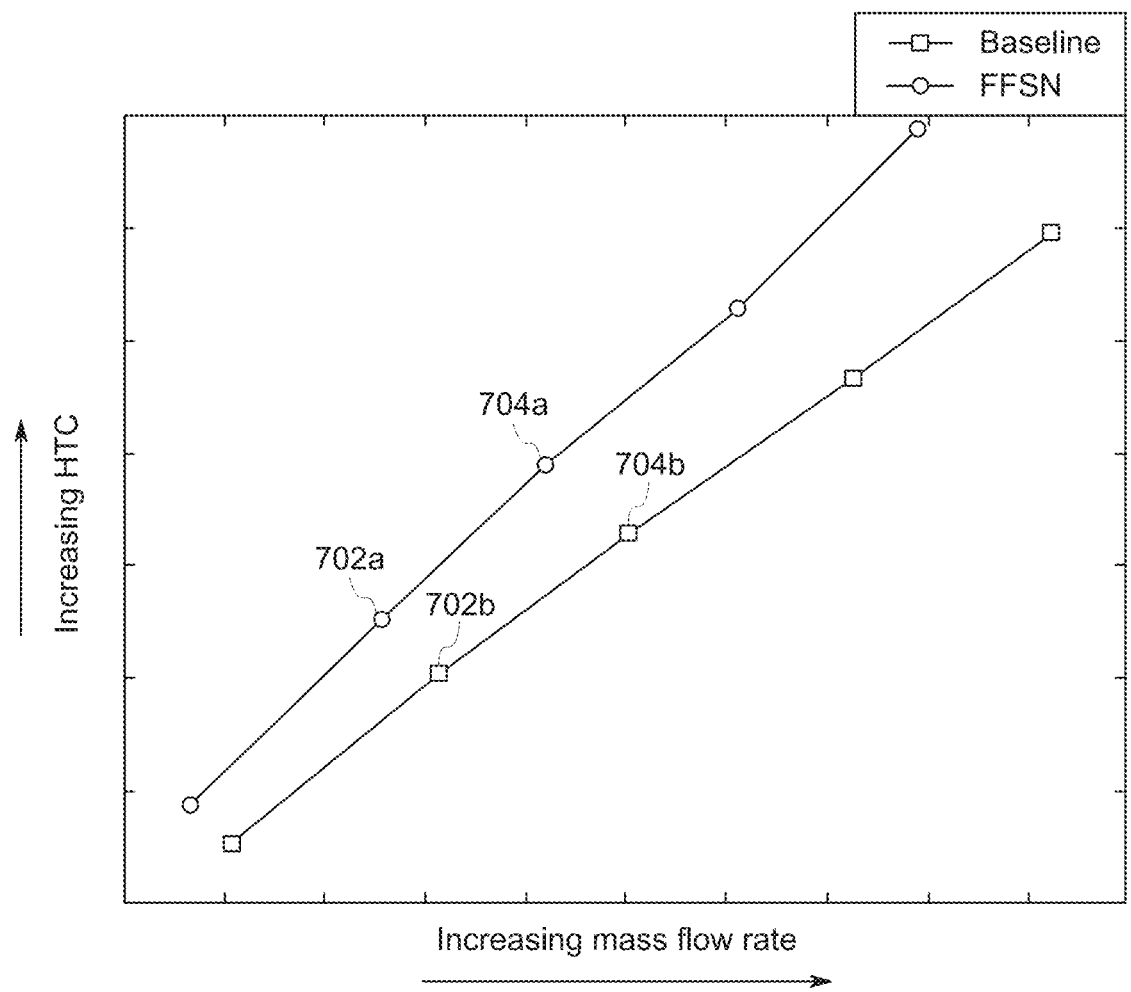
FIG. 7C illustrates a chart of heat transfer coefficient measurements versus mass flow rate measurements in accordance with one embodiment.

FIG. 7A is a graph illustrating a heat transfer coefficient (HTC) map corresponding to a channel that is devoid a forward facing step nozzle. FIG. 7B is a graph illustrating a heat transfer coefficient map corresponding to a channel having a forward facing step nozzle. For example, FIG. 7B illustrates a HTC map corresponding to channel 108 having the forward facing step nozzle 106 at the intersection 114 between the channel 108 and the second cooling cavity 104. FIG. 7C is a chart illustrating HTC measurements versus mass flow rate for a channel devoid a step nozzle and a channel having a step nozzle (e.g., step nozzle 106). FIGS. 7A, 7B and 7C will be discussed in detail together.

The channel 108 having the forward facing step nozzle 106 has a heat transfer coefficient (HTC) that is greater than the HTC for a baseline channel devoid a step nozzle. Illustrated in FIG. 7C, a point 702a charts the HTC for the forward facing step nozzle 106, and a point 702b charts the HTC for the baseline channel devoid a step nozzle. The points 702a, 702b are measured at the same pressure drop of the cooling air flowing through the turbine assembly. As demonstrated in FIG. 7C, point 702a has a HTC that is greater than a HTC at point 702b. Similarly, a point 704a for the forward facing step nozzle 106 has a HTC that is greater than a HTC at point 704b for the baseline channel devoid a step nozzle. The forward facing step nozzle 106 has an improved heat transfer than a channel devoid a step nozzle.

Figure 8:
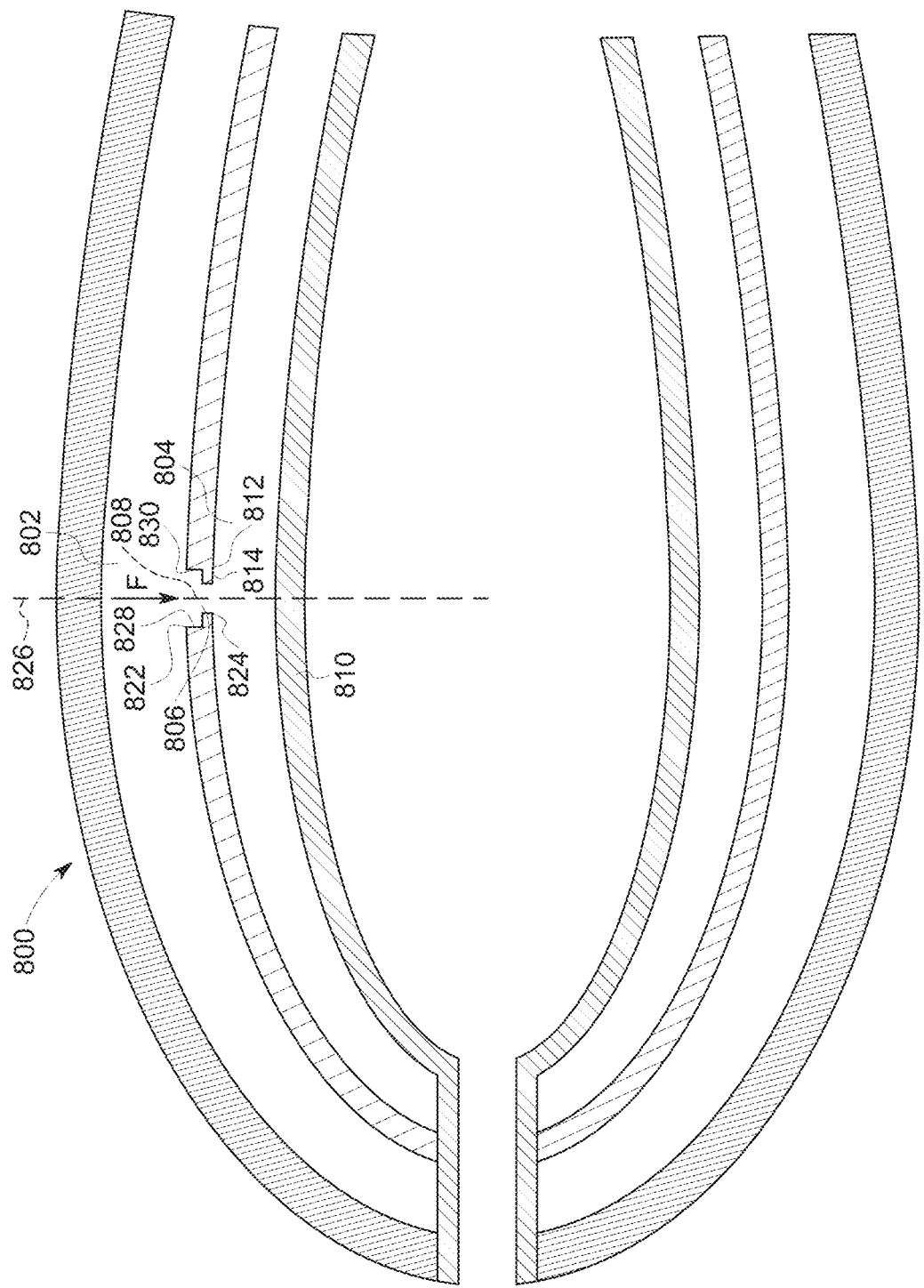
FIG. 8 illustrates a cross-sectional partial view of a combustion chamber in accordance with one embodiment.

FIG. 8 illustrates a cross-sectional partial view of a combustion chamber 800 in accordance with one embodiment. The combustion chamber 800 comprises a first cooling cavity 802 and a second cooling cavity 804. The first and second cooling cavities 802, 804 are disposed within the interior of the combustion chamber 800. The second cooling cavity 804 is disposed proximate a combustor wall 810 (corresponding to the leading edge 110 of FIG. 1) relative to the first cooling cavity 802. For example, the second cooling cavity 804 is disposed distal the hot gas that transfers through the combustion chamber relative to the first cooling cavity 802.

The first cooling cavity 802 is fluidly coupled with the second cooling cavity 804 by a forward facing step nozzle 806 (corresponding to the step nozzle 106 of FIG. 1). The forward facing step nozzle 806 forms a channel 808 that interconnects the first and second cooling cavities 802, 804. The channel has a first surface 828 and a second surface 830 opposite the first surface 828. The channel has a front end 822 that is open to the first cooling cavity 802 and a back end 824 that is open to the second cooling cavity 804.

The forward facing step nozzle 806 has steps 812 (corresponding to the steps 112 of FIGS. 1 and 2) at an intersection 814 between the channel 808 and the second cooling cavity 804. The steps 812 are generally planar with the intersection 814 at the back end 824 of the channel 808. Optionally, the steps 812 may be non-planar, perpendicular, angled, or the like with respect to the intersection 814. The steps extend into the channel 808 from the first and second surfaces 828, 830 in a direction towards a longitudinal axis 826. The steps 812 extend into the channel 808 such that a cross-sectional area of the channel 808 at the steps 812 is smaller than a cross-sectional area of the channel 808 outside of the steps 812. For example, the cooling air flowing in the direction F transfers through a narrowing channel 808 from the first cooling cavity 802 to the second cooling cavity 804.

The first cooling cavity 802 directs cooling air within the combustion chamber 800 to the second cooling cavity 804. The cooling air travels in a direction F from the first cooling cavity 802, through the channel 808 and the forward facing step nozzle 806, to the second cooling cavity 804. For example, the cooling air flows in a direction towards the combustor wall 810 of the combustion chamber 800 in order to cool the combustion chamber when the gas turbine is operating.

Figure 9:
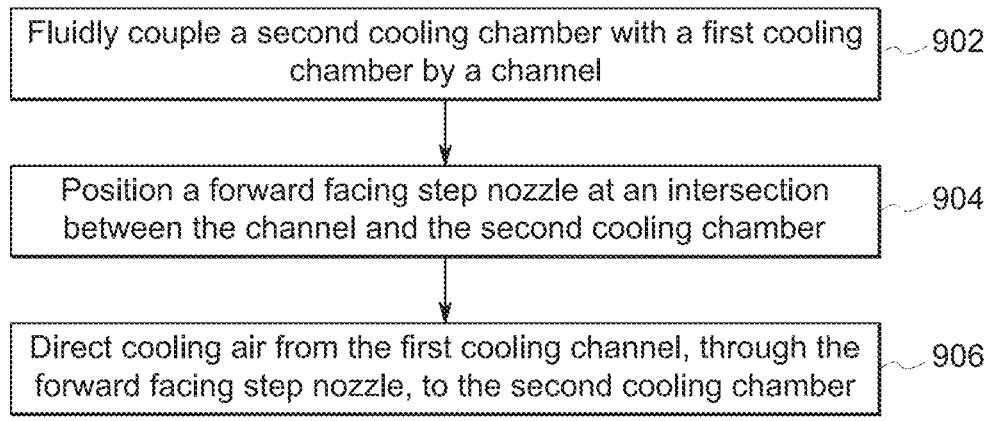
FIG. 9 illustrates a method flowchart in accordance with one embodiment.

FIG. 9 illustrates one embodiment of a method of operation of cooling the turbine assembly 100 or a combustion chamber 800. At 902, a second cooling cavity (e.g., second cooling cavity 104) is fluidly coupled with a first cooling cavity (e.g., first cooling cavity 102) by a channel (e.g., the channel 108). The first and second cooling cavities and channel are positioned internally within one or more of a turbine assembly or a combustion chamber.

At 904, a forward facing step nozzle is positioned at an intersection between the channel and the second cooling cavity. The forward facing step nozzle includes steps having elongated first sides and narrow second sides. The elongated first sides of the steps protrude into the channel a distance corresponding to the length of narrow second sides. For example, the elongated first sides of the steps protrude into the channel such that a cross-sectional area of the channel at the steps is smaller than a cross-sectional area of the channel outside of the steps. The forward facing step nozzle has a first pair of opposing sides and a second pair of opposing sides. The first pair of opposing sides do not include steps. The second pair of opposing sides include the steps.

At 906, cooling air is directed from the first cooling cavity, through the channel and the forward facing step nozzle, into the second cooling cavity.

In one embodiment, an assembly comprises a first cooling cavity disposed within one or more of a turbine assembly or a combustion chamber of an engine. The first cooling cavity directs cooling air within the one or more of the turbine assembly or the combustion chamber. The assembly comprises a second cooling cavity also disposed within the one or more of the turbine assembly or the combustion chamber. The second cooling cavity receives at least some of the cooling air from the first cooling cavity. A forward facing step nozzle forms a channel that fluidly couples the first cooling cavity with the second cooling cavity. The step nozzle includes steps having elongated first sides and narrow second sides. The elongated first sides or the steps protrude into the channel such that a cross-sectional area of the channel of the step nozzle at the steps is smaller than a cross-sectional area of the channel of the step nozzle outside of the steps.

In one example, the steps of the step nozzle are disposed on opposing sides of the channel of the step nozzle. The step nozzle has a cross-sectional shape with the opposing sides that include the steps and additional opposing sides that do not include steps. The step nozzle has a parallelogram cross-sectional shape having four sides with the steps of the step nozzle disposed on opposing sides of the parallelogram cross-sectional shape.

In one example, the step nozzle has a closed curve cross-sectional shape with the steps of the step nozzle disposed on opposing sides of the closed curve cross-sectional shape. The steps of the step nozzle are disposed at an intersection between the channel of the step nozzle and the second cavity. The first and second cooling cavities are disposed inside the turbine assembly with the second cooling cavity disposed closer to a leading edge of the turbine assembly than the first cooling cavity. The steps of the forward facing step nozzle are integrally fabricated as a continuous structure.

In one embodiment, an assembly comprises a first cooling cavity disposed within one or more of a turbine assembly or a combustion chamber of an engine. The first cooling cavity directs cooling air within the one or more of the turbine assembly or the combustion chamber. The assembly comprises a second cooling cavity also disposed within the one or more of the turbine assembly or the combustion chamber. The second cooling cavity receives at least some of the cooling air from the first cooling cavity. A forward facing step nozzle forms a channel that fluidly couples the first cooling cavity with the second cooling cavity. The step nozzle includes steps having elongated first sides and narrow second sides. The elongated first sides of the steps are disposed on opposing sides of the channel.

In one example, the elongated first sides of the steps protrude into the channel such that a cross-sectional area of the channel of the step nozzle at the steps is smaller than a cross-sectional area of the channel of the step nozzle outside of the steps. The step nozzle has a cross-sectional shape with the opposing sides that include the steps and additional opposing sides that do not include the steps. The step nozzle has a parallelogram cross-sectional shape having four sides with the steps of the step nozzle disposed on opposing sides of the parallelogram cross-sectional shape.

In one example, the step nozzle has a closed curve cross-sectional shape with the steps of the step nozzle disposed on opposing sides of the closed curve cross-sectional shape. The steps of the nozzle are disposed at an intersection between the channel of the step nozzle and the second cavity. The first and second cooling cavities are disposed inside the turbine assembly with the second cooling cavity disposed closer to a leading edge of the turbine assembly than the first cooling cavity. The steps and the forward facing step nozzle are integrally fabricated as a continuous structure.

In one embodiment, a method for cooling one or more of a turbine assembly or a combustion chamber of an engine comprises fluidly coupling a first cooling cavity and a second cooling cavity with a channel. The first cooling cavity directs cooling air within one or more of the turbine assembly or the combustion chamber. The second cooling cavity receives at least some of the cooling air from the first cooling cavity. The method comprises positioning a forward facing step nozzle at an intersection between the channel and the second cooling cavity. The step nozzle includes steps having elongated first sides and narrow second sides. The elongated first sides of the steps protrude into the channel such that a cross-sectional area of the channel of the step nozzle at the steps is smaller than a cross-sectional area of the channel of the step nozzle outside of the steps.

In one example, the method also includes disposing the steps of the step nozzle on opposing sides of the channel of the step nozzle. The method also includes integrally fabricating the steps and the forward facing step nozzle as a continuous structure. In one example the method also includes disposing the first and second cooling cavities inside of the turbine assembly with the second cooling cavity disposed closer to a leading edge of the turbine assembly than the first cooling cavity.

As use herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. An assembly comprising:
   a first cooling cavity disposed within one or more of a turbine assembly or a combustion chamber of an engine, the first cooling cavity configured to direct cooling air within the one or more of the turbine assembly or the combustion chamber;
   a second cooling cavity also disposed within the one or more of the turbine assembly or the combustion chamber, the second cooling cavity configured to receive at least some of the cooling air from the first cooling cavity; and
   a forward facing step nozzle forming a channel that fluidly couples the first cooling cavity with the second cooling cavity, the forward facing step nozzle including steps having elongated first sides and narrow second sides, the elongated first sides of the steps protruding into the channel such that a cross-sectional area of the channel of the forward facing step nozzle at the steps is smaller than a cross-sectional area of the channel of the forward facing step nozzle outside of the steps, wherein the steps of the forward facing step nozzle are disposed on first opposing sides of the channel of the forward facing step nozzle and no steps are disposed on second opposing sides of the channel.

2. The assembly of claim 1, wherein the forward facing step nozzle has a cross-sectional shape with the first opposing sides that include the steps and the second opposing sides that do not include the steps, wherein a distance between the steps at the first opposing sides is less than a distance between the second opposing sides.

3. The assembly of claim 1, wherein the forward facing step nozzle has a parallelogram cross-sectional shape having four sides with the steps of the forward facing step nozzle disposed on the first opposing sides of the parallelogram cross-sectional shape.

4. The assembly of claim 1, wherein the forward facing step nozzle has a closed curve cross-sectional shape with the steps of the forward facing step nozzle disposed on the first opposing sides of the closed curve cross-sectional shape.

5. The assembly of claim 1, wherein the steps of the forward facing step nozzle are disposed at an intersection between the channel of the forward facing step nozzle and the second cavity.

6. The assembly of claim 1, wherein the first and second cooling cavities are disposed inside the turbine assembly with the second cooling cavity disposed closer to a leading edge of the turbine assembly than the first cooling cavity.

7. The assembly of claim 1, wherein the steps and the forward facing step nozzle are integrally fabricated as a continuous structure.

8. A method for cooling one or more of a turbine assembly or a combustion chamber of an engine, the method comprising:

fluidly coupling a first cooling cavity and a second cooling cavity with a channel, the first cooling cavity configured to direct cooling air within one or more of the turbine assembly or the combustion chamber, the second cooling cavity configured to receive at least some of the cooling air from the first cooling cavity; and positioning a forward facing step nozzle at an intersection between the channel and the second cooling cavity, the forward facing step nozzle including steps having elongated first sides and narrow second sides, the elongated first sides of the steps protrude into the channel such that a cross-sectional area of the channel of the forward facing step nozzle at the steps is smaller than a cross-sectional area of the channel of the step nozzle outside of the steps, further comprising disposing the steps of the forward facing step nozzle on first opposing sides of the channel of the forward facing step nozzle, wherein no steps are disposed on second opposing sides of the channel.

9. The method of claim 8, further comprising integrally fabricating the steps and the forward facing step nozzle as a continuous structure.

10. The method of claim 8, further comprising disposing the first and second cooling cavity inside of the turbine assembly with the second cooling cavity disposed closer to a leading edge of the turbine assembly than the first cooling cavity.

\* \* \* \* \*